Aug. 4, 1970    B. D. CAVE, SR., ET AL    3,522,961
CABLE GRIPPING MEANS
Filed Oct. 26, 1967    2 Sheets-Sheet 1
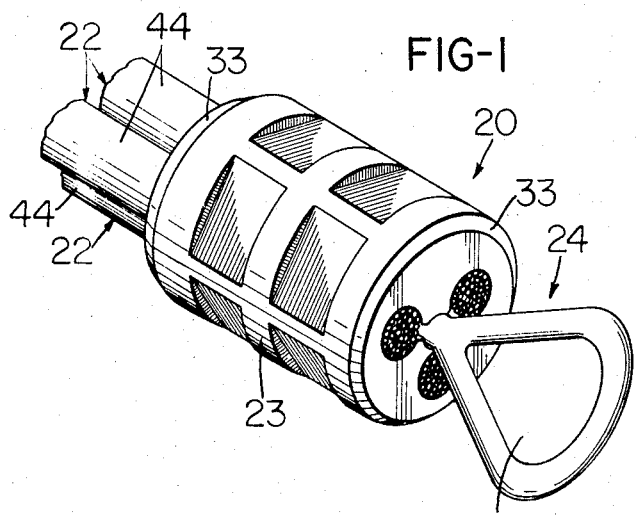
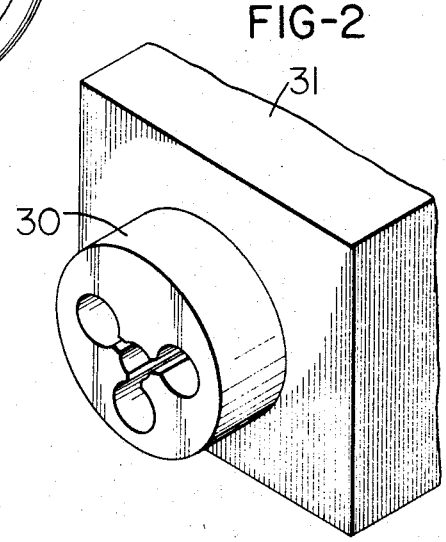
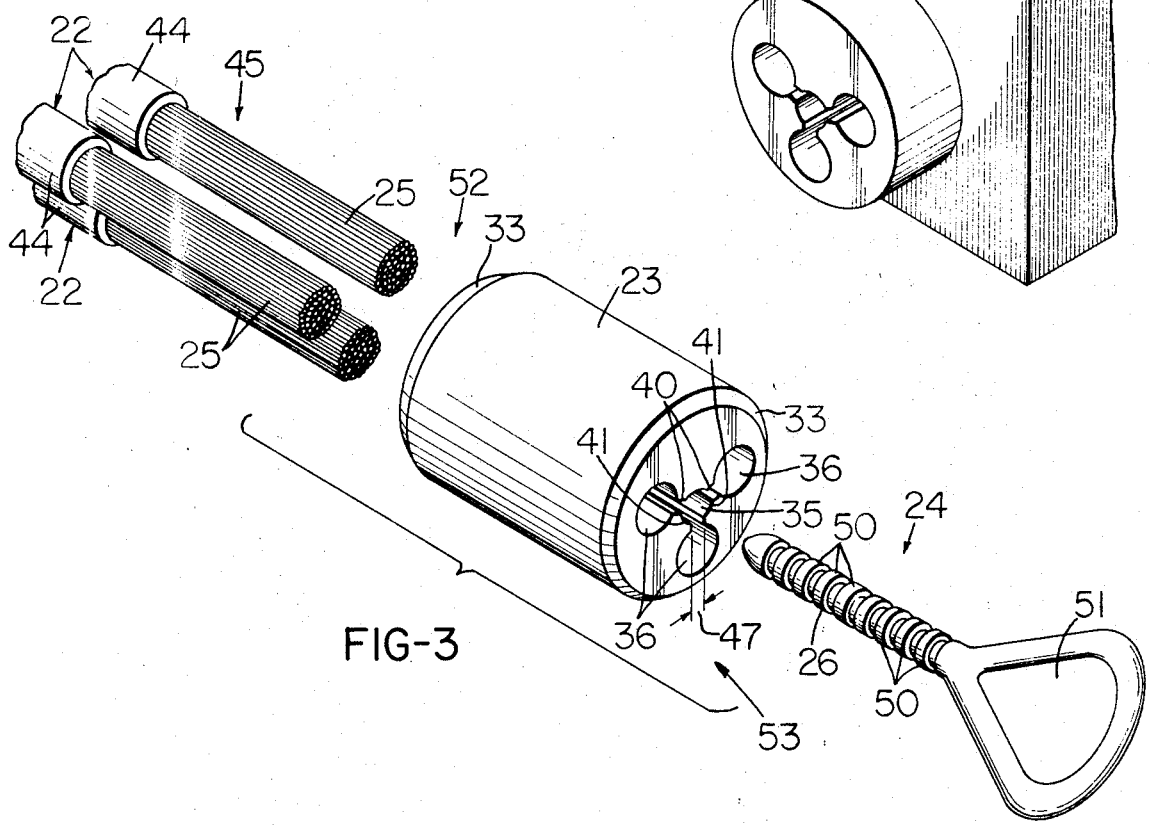
INVENTORS
BOYD D. CAVE, SR.
WARREN M. HIGGINS
BY
Glenn, Palmer & Lyne
THEIR ATTORNEYS INVENTORS
BOYD D. CAVE, SR.
WARREN M. HIGGINS
BY
Glenn, Palmer + Lyne

THEIR ATTORNEYS

United States Patent Office 3,522,961
Patented Aug. 4, 1970

3,522,961
CABLE GRIPPING MEANS
Boyd D. Cave, Sr., Chesterfield County, Va., and Warren M. Higgins, Louisville, Ky., assignors to Reynolds Metals Company, Richmond, Va., a corporation of Delaware
Filed Oct. 26, 1967, Ser. No. 678,283
Int. Cl. F16g *11/02*
U.S. Cl. 287—82     10 Claims

ABSTRACT OF THE DISCLOSURE

This disclosure relates to means for gripping the terminal end portion of one or more cables which is particularly adapted to enable easy pulling of electrical cables, for example, through an associated conduit. The assembly comprises a swageable body having a series of closely positioned channels receiving cable portions and an eyebolt therethrough. The body is swaged thereon.

BACKGROUND OF THE INVENTION

In many applications, it is necessary to grip a terminal end of an associated cable to pull such cable through an associated conduit. Usually a gripping and pulling device commonly referred to as a pulling eye is attached to such terminal end and used to pull such cable through the conduit. If in an effort to provide the required high strength attachment the pulling eye is made too long in length and/or with comparatively little clearance between its outer periphery and the inside surface of the associated conduit, then it is difficult and often impossible to pull the cable through such conduit especially if there are curves in the conduit. In addition, such pulling eye should be inexpensive to make and capable of being installed at the cable plant or in the field rapidly.

SUMMARY

This invention provides an improved cable pulling eye, or the like, and method of making same which is of simple and economical construction, is of comparatively short length and small diameter, and provides a high strength attachment at the terminal end of an associated cable to enable pulling such cable through an associated conduit in a rapid and efficient manner.

Other details, uses, and advantages of this invention will become apparent as the following description of the embodiment thereof presented in the accompanying drawings proceeds.

BRIEF DESCRIPTION OF THE DRAWINGS

The accompanying drawings show a present preferred embodiment of this invention, in which FIG. 1 is a perspective view of an exemplary embodiment of the improved cable gripping and pulling device or pulling eye of this invention installed in position at the terminal ends of associated cables;

FIG. 2 is a perspective view with parts broken away illustrating the manner of extruding an elongated hollow shape or member which is used to make the body of the pulling eye of FIG. 1;

FIG. 3 is an exploded perspective view particularly illustrating the exposed terminal ends of three electrical cables, the body portion of the pulling eye of FIG. 1, and an eyebolt prior to being fastened together to define such pulling eye;

DESCRIPTION OF ILLUSTRATED EMBODIMENT

Figure 4:
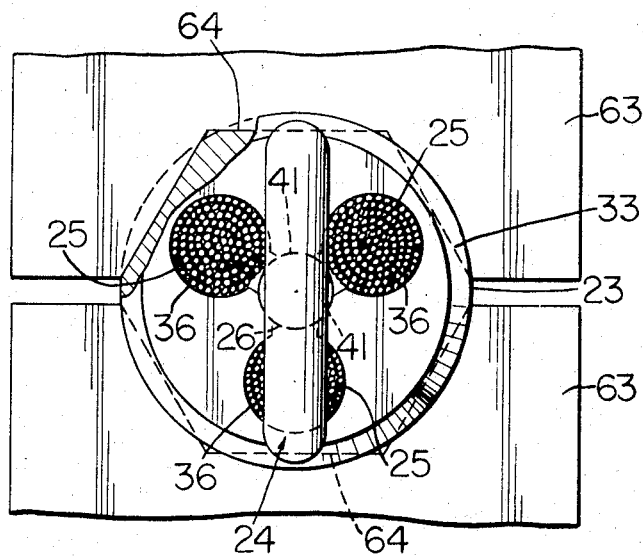
FIG. 4 is an end view of the components illustrated in FIG. 3 after assembling such components together and illustrating the arrangement of a pair of oppositely arranged dies of a press on opposite sides of the body to enable the body to be deformed radially inwardly against the terminal ends and against the eyebolt.

Reference is now made to FIG. 1 of the drawings wherein an exemplary cable gripping and pulling device commonly referred to as a cable pulling eye is illustrated and designated generally by the numeral 20. The pulling eye 20 of this exemplary embodiment of the invention is shown firmly attached to the terminal ends of three electrical cables each designated generally by the same numeral 22. However, it is to be understood that the cable gripping and pulling device of this invention can be attached to the terminal end of just one cable or to the terminal ends of any desired number of cables in substantially a like manner.

The cable pulling eye 20 is comprised of a body 23, which is of substantially cylindrical outline and has a central aperture and channel means formed therethrough as will be described in detail subsequently, and a rigid member shown as an eye bolt 24 which is adapted to be placed within the body 23 in side-by-side relation with terminal ends 25 of the cables 22. The body 23 is then deformed radially inwardly against a leg portion 26 of eyebolt 24 and the terminal ends 25 of the electrical cables 22 to provide the construction illustrated in FIG. 1 of the drawings which is comparatively compact having a short length and a comparatively small diameter, whereby the pulling eye 20 may be easily pulled through an associated conduit, if desired, and including around bends or curves in such conduit with minimum interference and in a rapid manner.

The body 23 of this example of the invention is preferably made from an elongated extruded hollow shape or member 30 the front end of which is shown emerging from a suitable extrusion die 31 in FIG. 2 of the drawings. The die 31 is suitably constructed so that the member 30 which is extruded therethrough has a unique internal configuration integrally formed therein during the extrusion process and to be described in detail in connection with the detailed description of the body 23.

The body 23 is readily formed using the extruded member 30 merely by cutting a desired length from member 30 and in this example of the invention the body 23 has each of its ends beveled as indicated by the same numeral 33 at each end. The beveled ends 33 enable the body 23 to be pulled through an associated conduit through which the cables 22 may be installed with minimum tendency of such body to dig into the conduit. Further, the beveled ends enable the body 23 and hence pulling eye 20 to be pulled around any curves that may be present in such conduit in an easier manner.

As seen particularly in FIG. 3 of the drawings, body 23 has an aperture 35 extending longitudinally through its full length which is adapted to receive leg 26 of eyebolt 24. The aperture 35 in this example of the invention is formed substantially through the center of body 23 so that its axis coincides with the longitudinal axis of body 23.

The body 23 also has three approximately cylindrical channels each designated by the same numeral 36 and each also extending along the full length of the body 23. The channels 36 are arranged through body 23 outwardly of the central aperture 35 in a symmetrical manner and substantially parallel to such aperture and hence are substantially parallel to each other.

The dimensional configuration of channels 36 within body 23 is such that each channel 36 would normally be tangent to center aperture 35 along an associated imaginary line. However, the web along this tangent line is removed an equal amount on either side of and extending the full length of body 23 to define an interconnecting passage designated by the numeral 40 between each channel 36 and aperture 35. The interconnecting passages 40 enable a single mandrel having a cross-sectional configuration corresponding to the cross-sectional outline of the cavity through body 23 to be used in extruding the elongated member 30 from which body 23 is cut.

Each immediately adjacent pair of channels 36 extending through body 23 also defines a projection 41 therebetween and each projection 41 will also be referred to as a gripping projection. Inasmuch as body 23 of this example has three channels 36 it will be seen that three projections 41 are provided in such body. Each projection 41 is urged against an associated portion of leg 26 of eyebolt 24 upon deforming the body 23 radially inwardly to thereby provide optimum holding action between the body 23 and eyebolt 24.

As indicated previously, the cables 22 shown in this example of the invention are illustrated as electrical cables and each electrical cable 22 has an outer electrical insulating sleeve 44. The terminal end section of each sleeve 44 is removed as best shown at 45 in FIG. 3 to thereby define each terminal end 25 which has metal strands defining its peripheral outline.

Each channel 36 in body 23 has a substantially cylindrical cross-sectional outline which corresponds to the approximately cylindrical outline of an associated terminal end 25 of an associated cable 22 to be inserted therewithin. In addition, each interconnecting passage 40 between a channel 36 and central elongated aperture 35 has a width, as indicated at 47 in FIG. 3, which is substantially smaller than the diameter of its associated channel 36. The substantially smaller width of passage 40 assures that for a given deformation of body 23 a portion of an associated terminal end 25 will be urged through such passage and firmly compressed against a portion of leg 26.

The eyebolt 24 of this example is preferably made of a harder material than the body 23 and has a suitable friction surface provided on its leg portion 26 which is defined by a plurality of spaced annular ridges each designated by the numeral 50 and only a representative few being so designated. The annular ridges 50 in the harder leg portion 26 cause portions of body 23 to be deformed therearound in a manner as will be described in more detail subsequently.

Although in this example of the invention leg portion 26 is shown as having a ridged configuraton defined by a plurality of annular ridges 50, it will be appreciated that in some applications of this invention leg portion 26 may be defined by an uninterrupted surface and yet provide sufficient holding action upon deforming the terminal ends 25 and projections 41 thereagainst. In addition, eyebolt 24 may be of a known construction having standard threads in its leg portion 26 to provide an eyebolt which is readily available and provides a high strength pulling eye.

The eyebolt 24 also has an eye or opening 51 provided in its terminal outer end which is adapted to receive a suitable member such as a flexible rope or the like therethrough to pull the pulling eye 20 and hence the cables 22 attached thereto through an associated conduit.

Reference is now made to FIGS. 3–6 of the drawings wherein it will be readily apparent how the pulling eye 20 of this invention and method of making such pulling eye provides an inexpensive and compact construction having optimum structural strength.

The end 25 of each cable 22 is inserted within an associated channel 36 in body 23 from one end as indicated at 52. The eyebolt 24 has its leg portion 26 inserted within aperture 35 in body 23 from the opposite or other end indicated at 53, whereby the leg portion 26 of eyebolt 24 and the ends 25 of cables 22 are arranged in parallel side-by-side relation. Also, each end 25 and leg 26 extends through its associated channel and aperture respectively substantially the full length of body 23.

Figure 5:
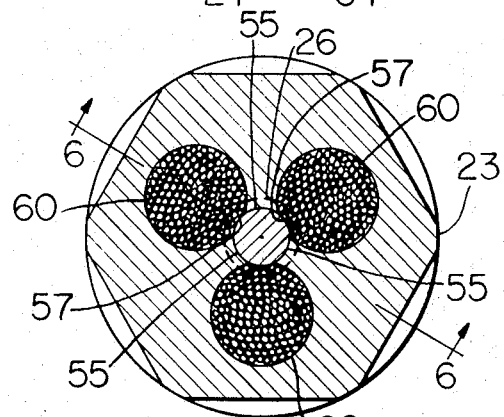
FIG. 5 is a cross-sectional view on the line 5—5 of FIG. 6.
Figure 6:
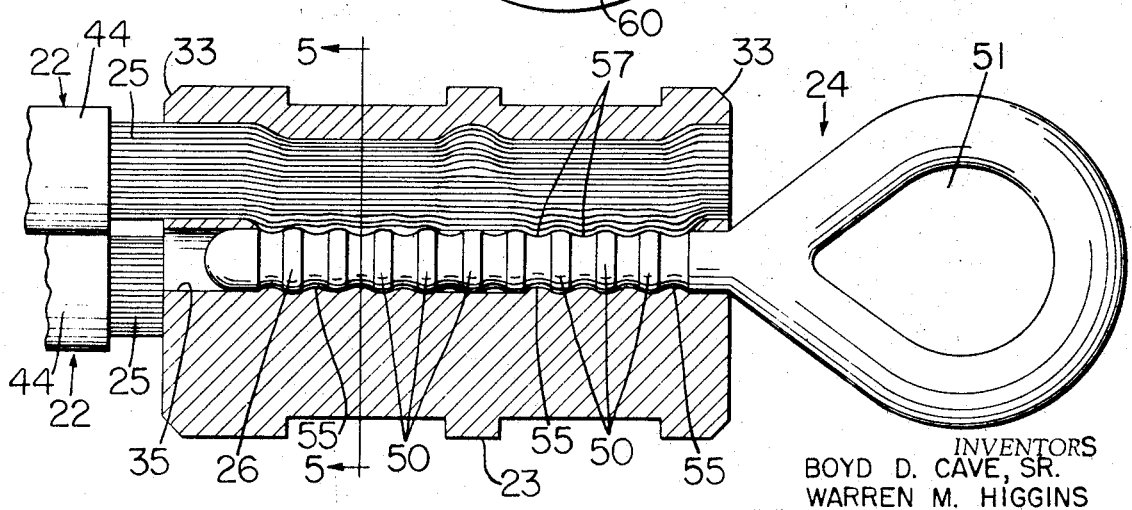
FIG. 6 is a cross-sectional view on the line 6—6 of FIG. 5.

With the ends 25 and eyebolt 24 thus positioned within body 23, such body is then deformed substantially radially inwardly in the manner illustrated in FIG. 4 to firmly attach the cables 22 and eyebolt 24 together through the use of the unique body 23. As best seen in FIGS. 5 and 6 of the drawings, parts of the body 23 and particularly the gripping projections 41 are deformed against associated portions of leg 26.

The deforming of each projection 41 against ridges 50 provided on leg 26 is facilitated because leg 26 is made of a substantially harder material, as previously mentioned. Thus, it will be seen that portions of body 23 comprising each projection 41 are moved in the annular grooves between each annular ridge 50 and as indicated at 55 which provides an intermeshing construction having high strength and capable of withstanding high pulling forces upon pulling eyebolt 24 substantially axially along the longitudinal axis of its leg portion 26 to pull cables 22 through an associated conduit, for example.

The deforming action against body 23 causes each end 25 of an associated cable 22 to be firmly compressed within its associated channel 36, as shown at 60 in FIG. 5. In addition, the deforming action against body 23 causes portions 57 of each end 25 to be moved through an associated interconnecting passage 40 and compressed between associated adjacent portions of leg 26 and body 23 to thereby also cause each end 25 to be deformed to follow the ridged contour defined by integral annular ridges 50 in leg 26 and further aid in firmly attaching each end 25 in position.

The deforming of body portion 23 may be accomplished using any suitable technique; however, in this example of the invention such deforming is achieved by mechanically swaging the body 23 radially inwardly using a suitable press having oppositely arranged dies each designated by the same numeral 63. The dies 63 of this example of the invention have cooperating bearing surfaces, each designated by the numeral 64, which cooperate to define a hexagonal outline whereby a corresponding deformation of substantially hexagonal peripheral configuration is provided in the body 23 as shown in FIGS. 1 and 5 of the drawings. The deformations, of substantially hexagonal outline, may be of short length as compared to the length of body 23 and in this example are provided along such body at two axially spaced locations so as to provide a firmer gripping action and a better intermeshing of parts of the body 23, eyebolt 24, and ends 25 upon mechanically swaging such components together.

For the three-strand pulling eye a hexagonal deformation is provided by bearing surfaces 64 of dies 63 at each applied location along body 23 which enables a substantially equal amount of pressure to be exerted against each cable end 25 and also enables the clamping pressure against leg 26 to be applied at substantially symmetrically arranged locations. For a two-strand pulling eye a pair of cooperating dies which define a bearing surface of square outline may be used and for a single-strand pulling eye the cooperating bearing surfaces of the swaging dies may be of octagonal, hexagonal, or approximately circular peripheral outline. In any event, it is generally desirable to provide cooperating dies which have configurations selected as determined by the number of cables being fastened within a body to enable application of substantially equal pressure against each cable end.

The extruded member 30 and hence body 23 may be made of any suitable material. In one application of this invention the body 23 was made of 6063–0 aluminum. In addition, the eyebolt 24 may also be similarly made of a suitable material; however, it is usually made of a material which is harder than body 23 and in the application mentioned above wherein a body 23 made of 6063–0 aluminum was used the eyebolt 24 was made of steel.

As mentioned earlier in this disclosure the pulling eye 20 of this invention is of unusually compact size when compared with presently known pulling eyes. To highlight such compact size exemplary dimensions will now be given for a typical body 23 which has been successfully used to provide a high strength three-strand pulling eye for simultaneously pulling three strands of 350 URD-P electrical cable. However, it is to be understood that the following dimensions are merely exemplary and such dimensions may be changed, as desired. Thus, the body 23 of a typical pulling eye 20 for the three strand 350 URD-P electrical cable is of substantially right circular cylindrical outline with a diameter prior to mechanical swaging of two and three sixteenths inches and a length of three and one-half inches. The end 25 of each strand of 350 URD-P cable 22 has the electrical insulating sleeve removed therefrom over a four inch section to assure there will be no interference by such sleeve during the swaging operation.

With the body 23 made of 6063–0 aluminum alloy and having dimensions as described above a steel eyebolt 24 having a configuration essentially as illustrated in FIG. 3 of the drawings was used and upon mechanically swaging the body against leg portion 26 of steel bolt 24 and ends 25 of the 350 URD-P cables it was possible to pull against bolt 24 with an axially applied force in excess of 13,500 pounds without failure.

The presentation in this specification has been made describing the device 20 of this invention as being particularly adapted to be used as a pulling eye 20 for pulling electrical cables 22 through an associated conduit. However, it would be appreciated that the device 20 of this invention may be utilized to pull ordinary cable means (not necessarily electrical cables) through an associated conduit.

Furthermore, while this specification highlights one exemplary use which may be made of the device of this invention, i.e., as a pulling eye, it is to be understood that the device 20 of this invention may also be effectively used in many applications such as, to anchor steel cables in position, suspend cables in any desired manner, and to tie together all types of structural members.

While present exemplary embodiments of this invention, and methods of practicing the same, have been illustrated and described, it will be recognized that this invention may be otherwise variously embodied and practiced within the scope of the following claims.

What is claimed is:

1. In combination: an elongated cable having a terminal end, a rigid member having a leg, and a body for attaching said cable and rigid member together, said body having a solid cross-sectional configuration throughout its length and having approximately cylindrical surface means defining a corresponding approximately cylindrical aperture extending through the full length of said body and receiving said leg, said body having an approximately cylindrical surface defining a corresponding approximately cylindrical channel extending through the full length of said body substantially parallel to said aperture, said cylindrical channel being tangent to said cylindrical aperture along an imaginary line, said body having a pair of spaced surfaces arranged on opposite sides of said imaginary line and extending between said aperture and said channel to define an interconnecting passage therebetween which extends the full length of said body, said channel receiving said terminal end of said cable therethrough so that said leg and terminal end are arranged in side-by-side relation, and said body being deformed substantially radially inwardly so that parts thereof are deformed against associated portions of said leg and said terminal end is compressed within said channel with portions thereof being moved radially inwardly through said interconnecting passage and compressed between associated portions of said leg and said body to provide a high strength attachment.

2. The combination as set forth in claim 1 in which said member comprises an eyebolt having said leg provided with a friction surface.

3. The combination as set forth in claim 1 in which said leg has a friction surface defined by a plurality of spaced annular ridges, said terminal end upon being compressed between said associated portions of said leg and said body is deformed to follow a ridged contour defined by said annular ridges and thereby aid in providing said high strength attachment.

4. The combination as set forth in claim 1 in which said cable comprises an electrical cable having said terminal end stripped of electrical insulation.

5. The combination as set forth in claim 1 in which said terminal end and said leg extend substantially through the full length of said body.

6. The combination as set forth in claim 1 in which said body is deformed against said leg and said terminal end at a plurality of axially spaced locations.

7. In combination: a plurality of elongated cables each having a terminal end, a rigid member having a leg provided with a friction surface, and a body for attaching said cables and rigid member together, said body having approximately cylindrical surface means defining a corresponding approximately cylindrical central aperture extending through the full length of said body and receiving said leg, said body having a plurality of approximately cylindrical surfaces defining a corresponding plurality of approximately cylindrical channels extending through the full length of said body substantially parallel to said aperture and said plurality of cylindrical surfaces corresponding in number to said plurality of cables, said plurality of cylindrical channels being arranged outwardly of and substantially parallel to said central aperture in a symmetrical manner and each receiving the terminal end of an associated cable therethrough, each of said cylindrical channels being tangent to said cylindrical aperture along an associated imaginary line, said body having a pair of spaced surfaces arranged on opposite sides of each imaginary line and extending between said aperture and each associated channel to define an associated interconnecting passage therebetween which extends the full length of said body with the width of each interconnecting passage being smaller than the diameter of its associated channel, said body being deformed substantially radially inwardly so that parts thereof are deformed against associated portions of said leg and each of said terminal ends is compressed within its channel with portions thereof being moved radially inwardly through an associated interconnecting passage and compressed in a sandwiched manner against associated portions of said leg to provide a high strength attachment.

8. The combination as set forth in claim 7 in which said member comprises an eyebolt having said friction surface on said leg defined by a plurality of spaced annular ridges and said body has a plurality of gripping projections which cooperate to define said roughly cylindrical surface means defining said aperture with each gripping projection being defined between each immediately adjacent pair of said plurality of channels, each projection being deformed against an associated portion of said friction surface on said leg to provide optimum holding action between said body and said eyebolt.

9. The combination as set forth in claim 8 in which said body comprises a metal body, said terminal ends and said leg each extends substantially through the full length of said body, and said body being deformed against said leg and said terminal ends at a plurality of axially spaced locations.

10. A metal body adapted to be deformed around a rigid member having a leg and around terminal ends of a plurality of cables to attach said member to said cables, said body having a solid cross-sectional configuration throughout its length and having approximately cylindrical surface means defining a corresponding approximately cylindrical aperture extending through the full length of said body and adapted to receive said leg of said member, said body having a plurality of approximately cylindrical surfaces defining a corresponding plurality of approximately cylindrical channels extending through the full length of said body substantially parallel to said aperture, each of said cylindrical channels being tangent to said cylindrical aperture along an imaginary line, said body having a pair of spaced surfaces arranged on opposite sides of each imaginary line and extending between said aperture and each associated channel to define an associated interconnecting passage therebetween which extends the full length of said body, each channel being adapted to receive a terminal end of an associated one of said cables therein so that said leg and terminal ends will be arranged in side-by-side relation and upon deforming said body substantially radially inwardly parts of said body will be deformed against associated portions of said leg and said terminal ends will be compressed within said channels with portions thereof moved radially inwardly through said interconnecting passages and compressed between associated portions of said leg and said body to provide a high strength attachment.

References Cited

UNITED STATES PATENTS

| | | | |
|---|---|---|---|
| 272,524 | 2/1883 | Brott | 287—78 |
| 438,400 | 10/1890 | Brennen | 287—78 |
| 3,060,258 | 10/1962 | Spurgeon | 287—75 |
| 3,376,170 | 4/1968 | Logan. | |
| 1,694,683 | 12/1928 | Cole | 24—122.6 |
| 1,980,426 | 11/1934 | Noyes | 24—122.6 X |
| 2,296,443 | 9/1942 | Kleinfelder | 287—78 |
| 2,587,095 | 2/1952 | Bergan. | |
| 2,889,603 | 6/1959 | Joy. | |

FOREIGN PATENTS

| | | |
|---|---|---|
| 57,252 | 8/1967 | Germany. |
| 938,242 | 10/1963 | Great Britain. |

BERNARD A. GELAK, Primary Examiner

U.S. Cl. X.R.

24—123, 122.6; 174—79; 339—276